United States Patent
Park

(10) Patent No.: US 11,180,247 B2
(45) Date of Patent: Nov. 23, 2021

(54) DRONE MOTOR AND DRONE COMPRISING SAME

(71) Applicant: LG INNOTEK CO., LTD., Seoul (KR)

(72) Inventor: Young Dae Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 431 days.

(21) Appl. No.: 16/307,903

(22) PCT Filed: Jun. 9, 2017

(86) PCT No.: PCT/KR2017/005995
§ 371 (c)(1),
(2) Date: Dec. 6, 2018

(87) PCT Pub. No.: WO2017/213451
PCT Pub. Date: Dec. 14, 2017

(65) Prior Publication Data
US 2019/0256203 A1    Aug. 22, 2019

(30) Foreign Application Priority Data
Jun. 9, 2016  (KR) .................. 10-2016-0071504

(51) Int. Cl.
*H02K 5/16*   (2006.01)
*B64C 27/12*  (2006.01)
(Continued)

(52) U.S. Cl.
CPC .............. *B64C 27/12* (2013.01); *B64C 27/08* (2013.01); *B64C 39/024* (2013.01); *B64D 27/24* (2013.01);
(Continued)

(58) Field of Classification Search
CPC ............ H02K 5/16; H02K 5/161; H02K 7/00; H02K 7/003; H02K 7/08; H02K 7/083
(Continued)

(56) References Cited

U.S. PATENT DOCUMENTS 4,629,261 A * 12/1986 Eiermann ........... F16C 32/0442
251/30.01
2008/0061646 A1   3/2008 Kodama et al.
(Continued)

FOREIGN PATENT DOCUMENTS

CN      105490491      4/2016
JP      H09-329137     12/1997
(Continued)

OTHER PUBLICATIONS

International Search Report (with English Translation) and Written Opinion dated Aug. 18, 2017 issued in Application No. PCT/KR2017/005995.
(Continued)

*Primary Examiner* — Terrance L Kenerly
(74) *Attorney, Agent, or Firm* — KED & Associates LLP

(57) ABSTRACT

One embodiment discloses a drone motor and a drone comprising the same, the drone motor comprising: a rotating shaft; a stator comprising a hole into which the rotating shaft is inserted; and a rotor arranged on the outer side of the stator, wherein a support member is arranged between the rotating shaft and the stator, and a bearing is arranged between the support member and the stator, wherein the support member comprises a body part which surrounds the rotating shaft, and a flange part which couples with the rotor.

9 Claims, 9 Drawing Sheets

(51) Int. Cl.
  *B64C 27/08* (2006.01)
  *B64C 39/02* (2006.01)
  *B64D 27/24* (2006.01)
  *H02K 7/00* (2006.01)
  *H02K 7/08* (2006.01)
  *B64D 35/02* (2006.01)

(52) U.S. Cl.
  CPC ............... *B64D 35/02* (2013.01); *H02K 5/16* (2013.01); *H02K 5/161* (2013.01); *H02K 7/00* (2013.01); *H02K 7/003* (2013.01); *H02K 7/08* (2013.01); *H02K 7/083* (2013.01); *B64C 2201/027* (2013.01); *B64C 2201/042* (2013.01); *B64C 2201/108* (2013.01)

(58) Field of Classification Search
  USPC .......................................................... 310/90
  See application file for complete search history.

(56) References Cited

U.S. PATENT DOCUMENTS

2015/0015104 A1  1/2015  Kataoka et al.
2017/0070113 A1*  3/2017  Oh ..................... H02K 1/2786

FOREIGN PATENT DOCUMENTS

| JP | 2008-092790 | 4/2008 |
| JP | 2013-022675 | 2/2013 |
| KR | 10-1016604 | 2/2011 |
| KR | 10-2015-0103439 | 9/2015 |

OTHER PUBLICATIONS

Chinese Office Action dated Mar. 9, 2020 issued in Application No. 201780036103.5.

* cited by examiner

DRONE MOTOR AND DRONE COMPRISING SAME

CROSS-REFERENCE TO RELATED PATENT APPLICATIONS

This application is a U.S. National Stage Application under 35 U.S.C. § 371 of PCT Application No. PCT/KR2017/005995, filed Jun. 9, 2017, which claims priority to Korean Patent Application No. 10-2016-0071504, filed Jun. 9, 2016, whose entire disclosures are hereby incorporated by reference.

TECHNICAL FIELD

The present invention relates to a drone motor and a drone including the same.

BACKGROUND ART

Recently, unmanned aerial vehicles (UAVs), such as a drone, have been used in various fields such as distribution delivery, disaster relief, broadcasting, leisure, or the like in addition to a military purpose due to various advantages such as convenience, quickness, economic feasibility, and the like. Accordingly, demands for the drone have explosively increased.

Since functions of a drone are diversified, the drone has been implemented as a multimedia player having multiple functions such as taking a picture or recording a video, reception of a broadcast, and the like.

A motor can be used for a driving method for flying the drone. That is, the drone can fly when a propeller is rotated by rotation of the motor. However, since a force in an axial direction (thrust) is applied to the motor when the propeller is rotated, many fixing members are designed in the motor to withstand the force. Accordingly, since material cost increases and an assembly process becomes complicated, a cost of the motor increases.

Further, since a rotating shaft having a large diameter is required for securing strength, motor efficiency is degraded.

DISCLOSURE

Technical Problem

The present invention is directed to providing a drone motor capable of withstanding a force in an axial direction generated during rotation, and a drone including the same.

Further, the present invention is directed to providing a drone motor capable of variously adjusting a size of a rotating shaft or a bearing, and a drone including the same.

In addition, the present invention is directed to providing a lightened motor and a drone including the same.

Technical Solution

One aspect of the present invention provides a drone motor which includes: a rotating shaft; a stator including a hole into which the rotating shaft is inserted; and a rotor disposed at an outside of the stator, wherein a support member is disposed between the rotating shaft and the stator, a bearing is disposed between the support member and the stator, and the support member includes a body part configured to surround the rotating shaft, and a flange part coupled to the rotor.

The bearing may include a first bearing disposed between the rotating shaft and the stator, and a second bearing disposed between the rotating shaft and the stator, and the support member may include a first support member including a first body part disposed between the rotating shaft and the first bearing and a first flange part coupled to the rotor, and a second support member including a second body part disposed between the rotating shaft and the second bearing and a second flange part.

The rotating shaft, the first support member, the second support member, and the rotor may rotate together.

The drone motor may further include a housing in which the stator is accommodated, wherein the housing may include a bottom part, and a protruding part which axially protrudes from the bottom part and into which a stator core is inserted.

The protruding part may include a first hole formed in an axial direction thereof, the rotating shaft may pass through the first hole, and the first bearing and the second bearing may be disposed in the first hole.

The first hole may include a step by which the first bearing is spaced apart from the second bearing in the axial direction.

The first support member may be inserted into one side of the first hole to fix the first bearing in the first hole, and the second support member may be inserted into the other side of the first hole to fix the second bearing in the first hole.

A diameter of the first flange part may be greater than an inner diameter of the first bearing and smaller than an outer diameter of the first bearing, and a diameter of the second flange part may be greater than an inner diameter of the second bearing and smaller than an outer diameter of the second bearing.

The rotor may include a rotor core facing an outer circumferential surface of the stator, a plurality of magnets disposed on an inner surface of the rotor core, and a cover configured to cover the rotor core The cover may include a plurality of blades and holes disposed between the blades.

The cover may include a first groove in which the first flange part is accommodated.

The first flange part may include at least one first protrusion configured to protrude toward the cover and inserted into a bottom surface of the first groove.

The second flange part may include second protrusions of which the number is the same as that of the first protrusions.

Another aspect of the present invention provides a drone which includes: a main body; a plurality of motors connected to the main body; and blade parts coupled to the plurality of motors, wherein the motor includes a rotating shaft, a stator including a hole into which the rotating shaft is inserted, and a rotor disposed at an outside of the stator, a support member is disposed between the rotating shaft and the stator, a bearing is disposed between the support member and the stator, and the support member includes a body part configured to surround the rotating shaft, and a flange part coupled to the rotor.

Advantageous Effects

According to embodiment, a drone motor can withstand a force generated in an axial direction during rotation.

Further, the degree of freedom in a design of a diameter of a rotating shaft and an inner diameter of a bearing can be secured by adjusting a thickness of a support member.

In addition, a weight of a motor can be reduced by lightening the support member and decreasing the diameter of the rotating shaft.

Various useful advantages and effects of the present invention are not limited to the above and may be relatively easily understood in a process of describing exemplary embodiments of the present invention.

MODES OF THE INVENTION

Embodiments of the present invention may be modified into other forms or some of the embodiments may be combined, and the scope of the present invention is not limited to embodiments which will be described below.

Although items described in a specific embodiment are not described in another embodiment, the items may be understood as a description related to another embodiment unless a description opposite or contradictory to the items is in another embodiment.

For example, when a characteristic of a configuration A is described in a specific embodiment and a characteristic of a configuration B is described in another embodiment, the characteristics of the configurations are understood to be in the scope of the present invention unless an opposite or contradictory description is present even when an embodiment in which the configuration A and the configuration B are combined is not clearly disclosed.

In the description of the embodiment, when one element is disclosed to be formed "on or under" another element, a term "on or under" includes both a case in which the two elements are in direct contact with each other and a case in which at least still another element is disposed between the two elements (indirectly) to be formed. Further, when the term "on or under" is expressed, a meaning as an upward direction and a downward direction with respect to one element may also be included.

Hereinafter, embodiments of the present invention will be described in detail with reference to the accompanying drawings so that those skilled in the art may easily perform the embodiment of the present invention.

Figure 1:
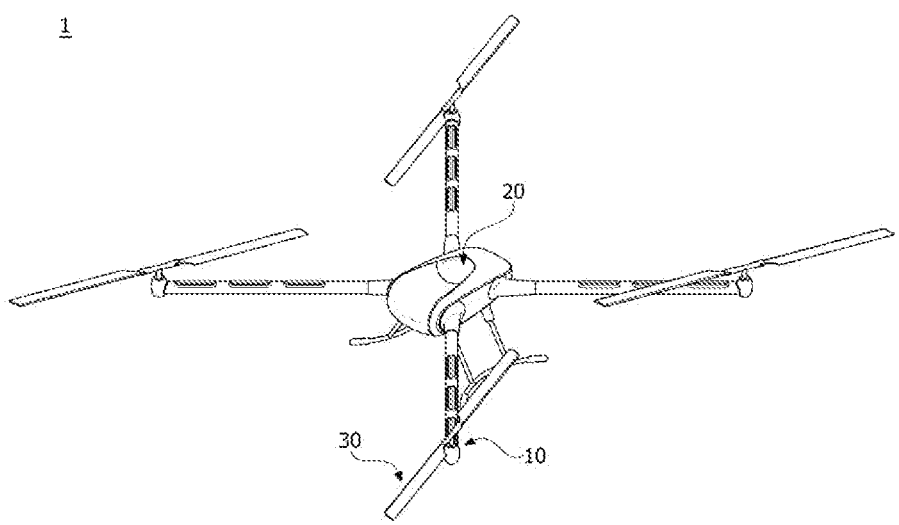
FIG. 1 is a schematic view of a drone according to an embodiment of the present invention.
Figure 2:
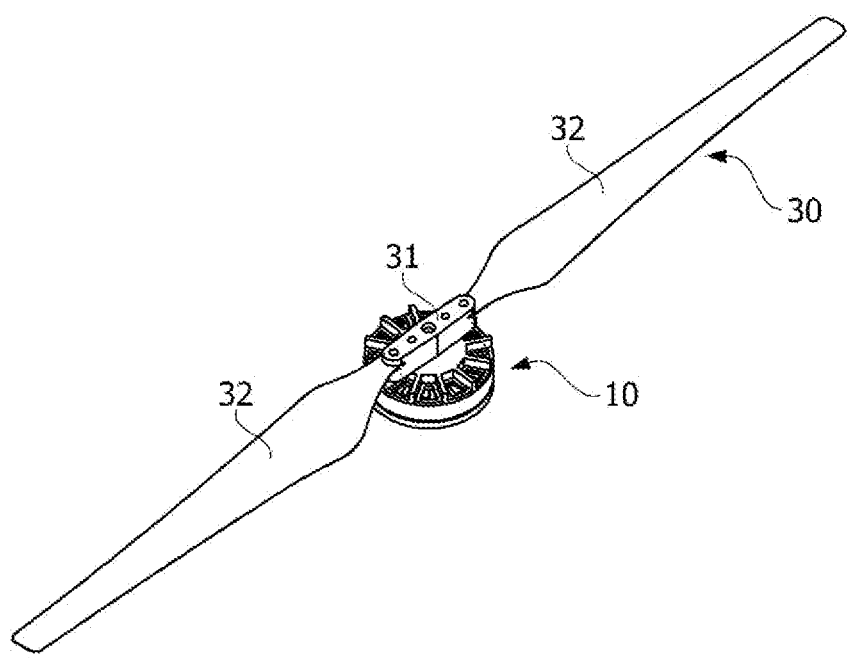
FIG. 2 is a view illustrating a motor and blade parts.

FIG. 1 is a schematic view of a drone according to an embodiment of the present invention, and FIG. 2 is a view illustrating a motor and blade parts.

Referring FIG. 1, a drone 1 according to the embodiment includes a main body 20 and a plurality of blade parts 30 connected to the main body 20. The drone may include any unmanned aerial vehicle capable of flying due to rotation of the blade parts 30.

A shape of the drone according to the embodiment is not particularly limited. The blade parts 30 are shown as propellers but the present invention is not necessarily limited thereto, and any structure capable of allowing the main body 20 to fly may be applied.

The blade parts 30 according to the embodiment are exemplified as four blade parts but the number of blade parts is not particularly limited. A shape of the main body 20 and the number of blade parts 30 may be variously changed.

Referring FIG. 2, the blade part 30 may include an engaging part 31 coupled to the motor 10 and a pair of blades 32 coupled to the engaging part 31. The blade 32 may have a spiral shape in an extending direction thereof but the present invention is not necessarily limited thereto.

Figure 3:
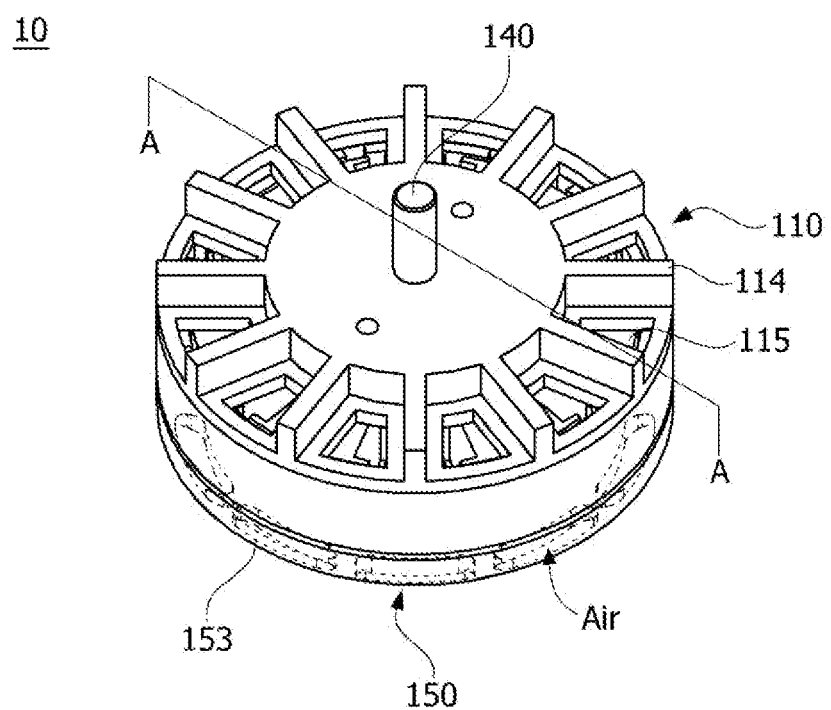
FIG. 3 is a schematic view of the motor according to the embodiment of the present invention.
Figure 4:
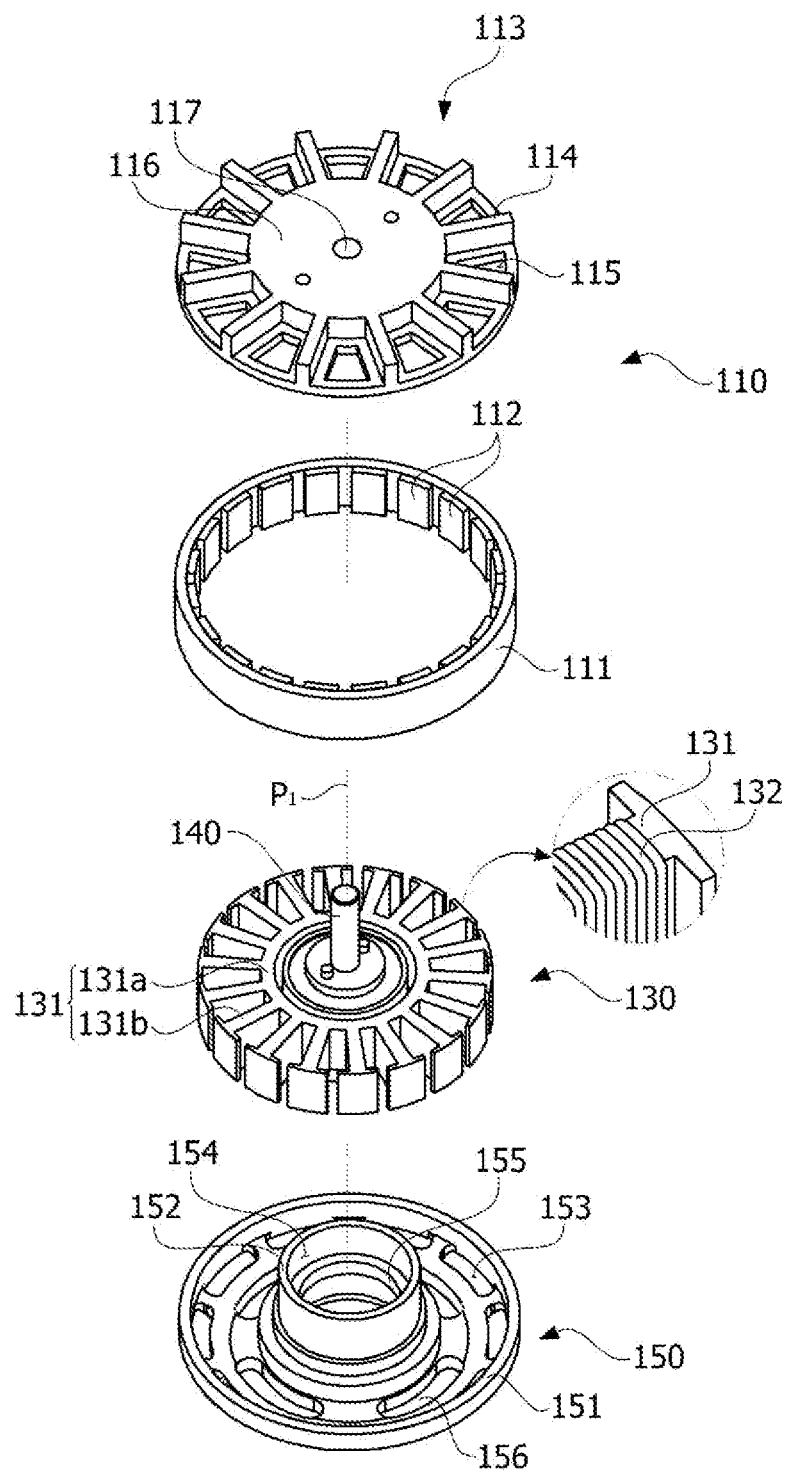
FIG. 4 is an exploded perspective view of FIG. 3.

FIG. 3 is a schematic view of the motor according to the embodiment of the present invention, and FIG. 4 is an exploded perspective view of FIG. 3.

Referring to FIGS. 3 and 4, the motor 10 according to the embodiment includes a housing 150, a stator 130, a rotating shaft 140, and a rotor 110.

The housing 150 includes a bottom part 151 and a protruding part 152 which protrudes from a center of the bottom part 151 in an axial direction P1 and into which a stator core 131 is inserted. The housing 150 may be made of a plastic material but is not particularly limited thereto.

The protruding part 152 includes a first hole 154 formed in the axial direction P1. The protruding part 152 may have a cylindrical shape. A step 155 may be formed along an inner wall of the first hole 154.

The bottom part 151 may have a plurality of holes 153 and 156 formed therein. Accordingly, external air may be suctioned through the holes 153 and 156 when the motor 10 rotates. For example, the holes 153 and 156 may include a plurality of second holes 153 disposed in an edge of the bottom part 151, and a plurality of third holes 156 disposed between the protruding part 152 and the plurality of second holes 153. However, the number and shapes of holes 153 and 156 may be variously changed.

The stator 130 may include the stator core 131 and a coil 132.

The stator core 131 may be inserted into and fixed to the protruding part 152. The stator core 131 may have a plurality of teeth 131b radially disposed from a ring-shaped center part 131a. The stator core 131 may be integrally formed, but is not necessarily limited thereto, and may have a structure in which a plurality of divided cores are combined.

The coil 132 may be wound around each of the teeth 131b. The number of and winding shape of coils 132 may be changed according to a type of the motor 10. For example, in the case of a three-phase motor, the coil 132 may be wound so that power having a U phase, a V phase, and a W phase may be applied.

The rotor 110 may be disposed to surround an upper part and a side surface of the stator 130. The rotor 110 may include a ring-shaped rotor core 111, a magnet 112, and a cover 113. The magnet 112 may be disposed on an inner circumferential surface of the rotor core 111 to face an outer circumferential surface of the stator 130.

The cover 113 may be disposed on the rotor core 111 and rotate therewith. The cover 113 may include a plurality of blades 114 configured to radially extend from a center part 116, and fourth holes 115 disposed between the blades 114. Accordingly, air may circulate due to the blades 114 when the rotor rotates.

That is, the external air may be introduced into the motor 10 through the second and third holes 153 and 156 formed in the bottom part 151 of the housing 150 and may be discharged through the fourth holes 115 formed in the cover 113. However, on the other hand, the external air may be introduced through the fourth holes 115 formed in the cover 113 and may be discharged through the second and third holes 153 and 156 formed in the bottom part 151 of the housing 150.

Accordingly, heat generated inside of the motor 10 may be emitted to the outside. However, a heat emission structure is not necessarily limited thereto. That is, shapes and disposition of the blades 114 and the hole 115 may be variously changed. The blades 114 may have a curvature and may be arbitrarily disposed.

The rotating shaft 140 may pass through the first hole 154 of the housing 150, a center of the stator core 131, and a center 117 of the cover 113 to be exposed to the outside. The exposed end of the rotating shaft 140 may be coupled to the blade parts.

According to the embodiment, the rotor core 111 disposed on the outer circumferential surface of the stator 130, the cover 113, and the rotating shaft 140 may rotate together. In this case, the air may circulate into the motor due to the blades 114 of the cover 113.

Figure 5:
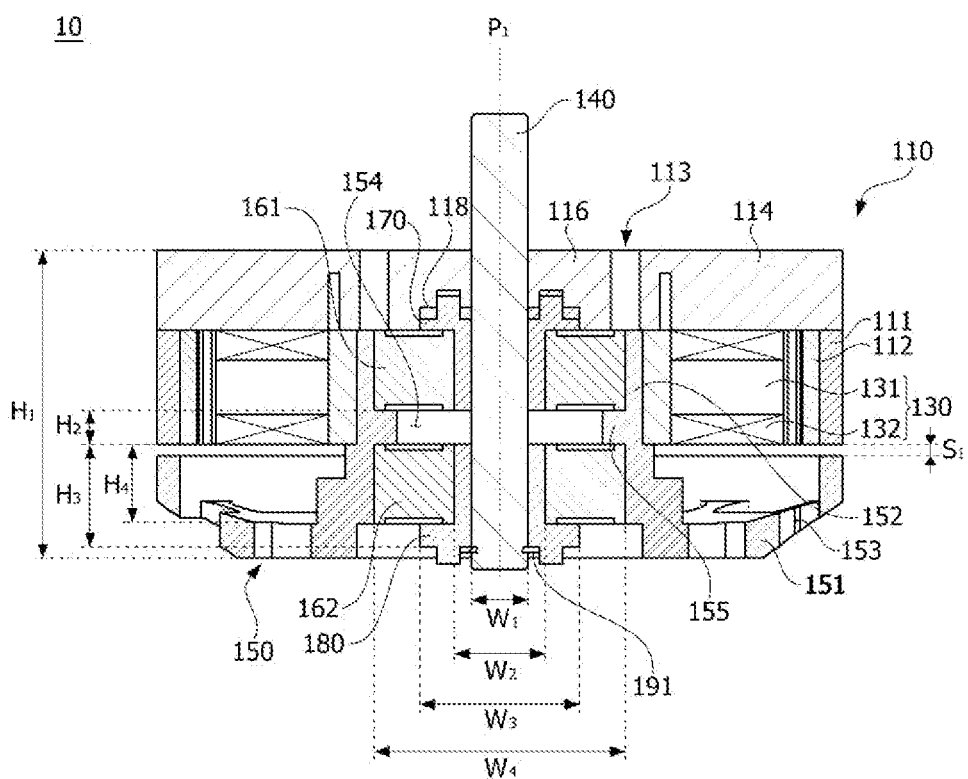
FIG. 5 is a cross-sectional view taken along line A-A of FIG. 3.
Figure 6:
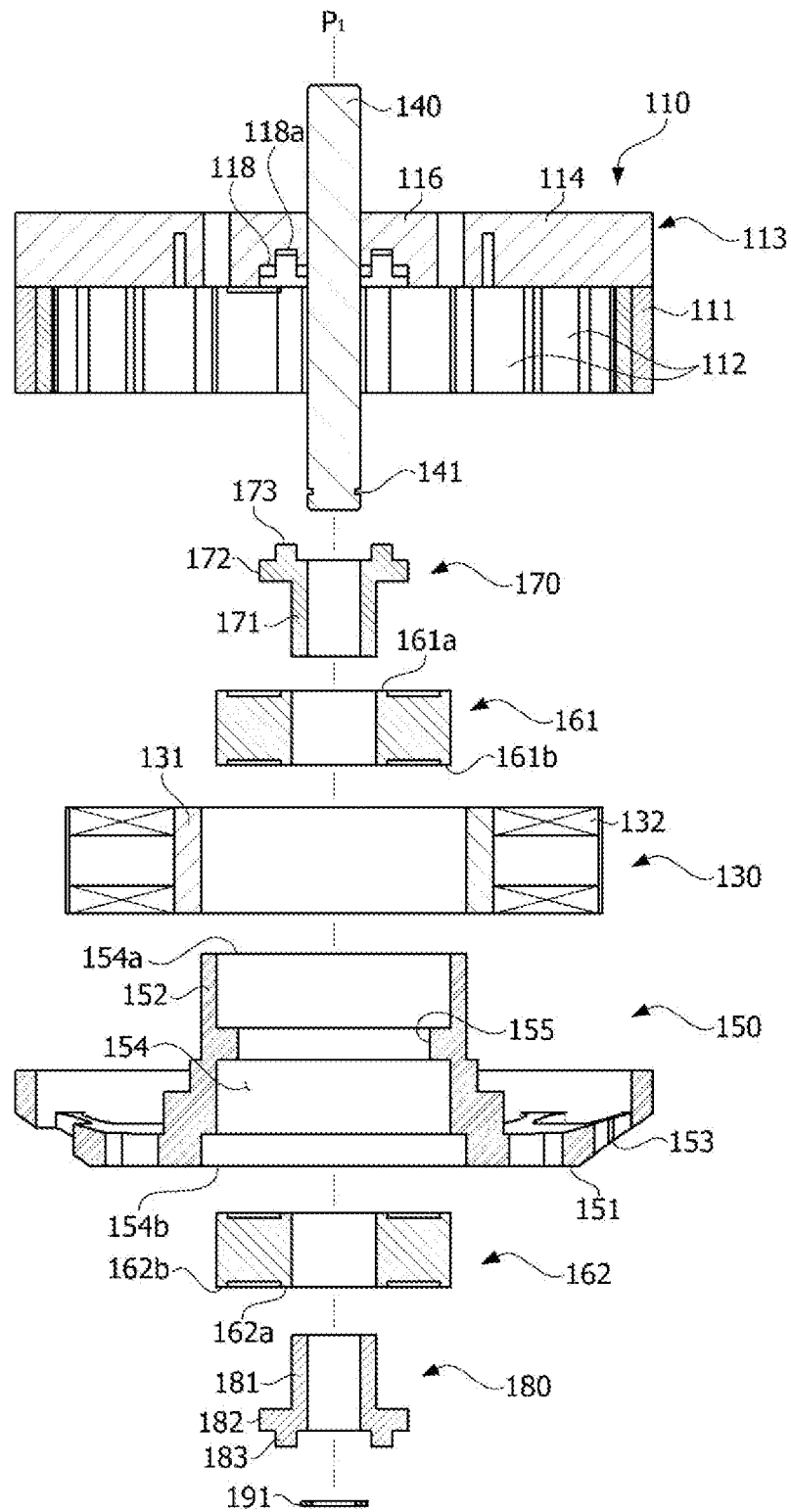
FIG. 6 is an exploded view of FIG. 5.
Figure 7:
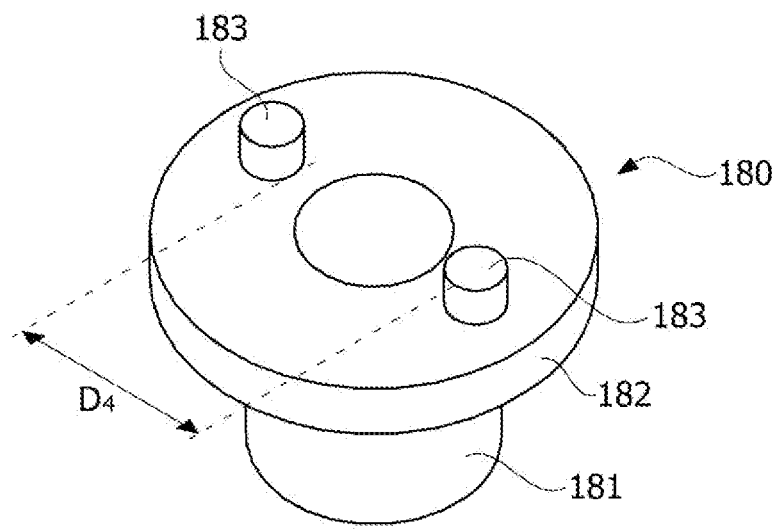
FIG. 7 is a perspective view of a support member.
Figure 8:
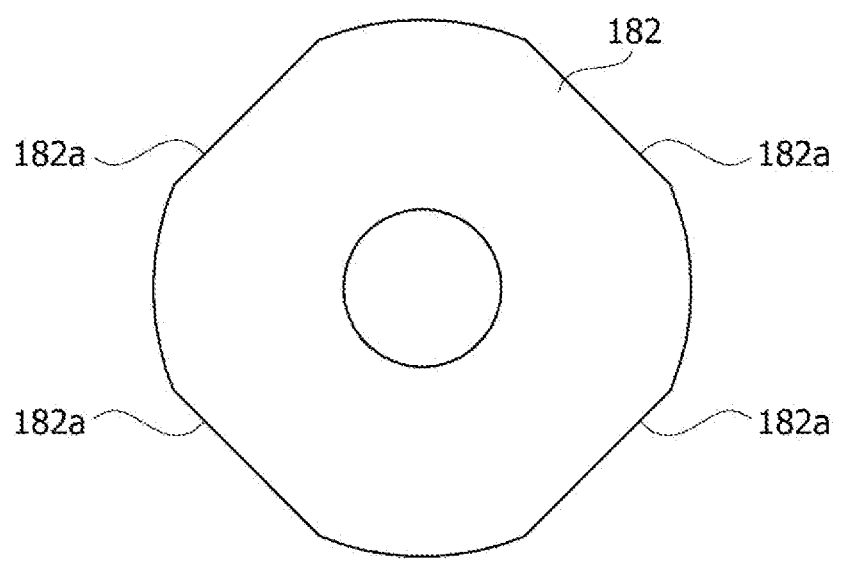
FIG. 8 is a modified example of FIG. 7.

FIG. 5 is a cross-sectional view taken along line A-A of FIG. 3, FIG. 6 is an exploded view of FIG. 5, FIG. 7 is a perspective view of a support member, and FIG. 8 is a modified example of FIG. 7.

Referring to FIGS. 5 and 6, a first bearing 161 and a second bearing 162 may be disposed in the first hole 154 formed in the protruding part 152 of the housing 150. Various bearings each having an inner diameter part rotatable in a state in which an outer diameter part is fixed may be selected as the first bearing 161 and the second bearing 162.

The first bearing 161 and the second bearing 162 may be spaced apart in the axial direction P1. Accordingly, rotating shafts having various lengths may be supported by adjusting a separation distance H2 between the first bearing 161 and the second bearing 162.

The step 155 may be formed on the inner wall of the first hole 154. The separation distance H2 between the first bearing 161 and the second bearing 162 may be determined by a thickness of the step 155. The step 155 may protrude to enough to support outer diameter parts 161b and 162b of the first bearing 161 and the second bearing 162. For example, the separation distance H2 between the first bearing 161 and the second bearing 162 may be in the range of 2.0 mm to 4.0 mm.

However, the present invention is not necessarily limited to the above, and the first bearing 161 and the second bearing 162 may not be spaced apart from each other. For example, the first bearing 161 and the second bearing 162 may come into contact with each other in the axial direction P1. In this case, the first bearing 161 and the second bearing 162 may rotate together.

A first support member 170 may be disposed between the rotating shaft 140 and the first bearing 161. The first support member 170 includes a first body part 171 formed in a cylindrical shape and configured to surround the rotating shaft 140 and a first flange part 172 disposed at an end of the first body part 171. The first support member 170 may be inserted into the rotating shaft 140 and rotate together. That is, the first bearing 161 may support rotation of the first support member 170.

The first support member 170 may be inserted into one side 154a of the first hole 154. In this case, the first flange part 172 may press an inner diameter part 161a of the first bearing 161. Accordingly, the first bearing 161 may be fixed in the axial direction P1 by the step 155 and the first support member 170.

A second support member 180 may be disposed between the rotating shaft 140 and the second bearing 162. The second support member 180 includes a second body part 181 formed in a cylindrical shape and configured to surround the rotating shaft 140 and a second flange part 182 disposed at an end of the second body part 181. The second support member 180 may be inserted into the rotating shaft 140 and rotate together. That is, the second bearing 162 may support rotation of the second support member 180.

The second support member 180 may be inserted into the other side 154b of the first hole 154. In this case, the second flange part 182 may press an inner diameter part 162a of the second bearing 162. The second bearing 162 may be fixed in the axial direction P1 by the step 155 and the second support member 180.

According to the embodiment, the first bearing 161 and the second bearing 162 may be fixed in the first hole 154 in the axial direction P1 by the first support member 170 and the second support member 180.

The first support member 170 may be coupled to the cover 113 in a state of being coupled to the rotating shaft 140, and the second support member 180 may be coupled to the rotating shaft 140 by a fixing pin 191. Accordingly, the motor can withstand a force applied to the rotating shaft 140 in the axial direction. However, the present invention is not necessarily limited to the above, and the first bearing 161 and the second bearing 162 may be fixed in the axial direction using either the first support member 170 or the second support member 180.

A diameter W3 of the first flange part 172 of the first support member 170 may be greater than an inner diameter W2 of the first bearing 161 and may be smaller than an outer diameter W4 of the first bearing 161. Further, a diameter W3 of the second flange part 182 of the second support member 180 may be greater than an inner diameter W2 of the second bearing 162 and may be smaller than an outer diameter W4 of the second bearing 162.

For example, a diameter W1 of the rotating shaft 140 may be in the range of 4 mm to 10 mm. A thickness (W2−W1) of the first support member 170 may be in the range of 0.5 mm to 3.0 mm. A maximum diameter (a diameter of the first flange part, W3) of the first support member 170 may be in the range of 10 mm to 15 mm. For example, the maximum diameter W3 of the first support member 170 may be at least 2.0 mm greater than the inner diameter W2 of the first bearing 161.

A height H1 of the motor may be in the range of approximately 20 mm to 30 mm. A height H3 of the second support member 180 may be at least 2.0 mm greater than a height H4 of the second bearing 162.

The first support member 170 and the second support member 180 may have the same shape. As described above, the first support member 170 and the second support member 180 are inserted into the first hole 154 in opposite directions and thus may be disposed in shapes symmetrical to each other on the basis of the step 155.

A slit 141 may be formed in an outer circumferential surface of the other end of the rotating shaft 140. Accordingly, the second support member 180 may be fixed to the rotating shaft 140 by fitting the fixing pin 191 into the slit 141 after inserting the second support member 180 into the rotating shaft 140.

The cover 113 may have a first groove 118 formed in an inner circumferential surface thereof to accommodate the first flange part 172 of the first support member 170. Accordingly, the rotor 110, the first support member 170, the second support member 180, and the rotating shaft 140 may integrally rotate. The rotor core 111 may be spaced a distance S1 from the housing 150 in the axial direction for rotation of the rotor.

The first flange part 172 may include a plurality of first protrusions 173 configured to protrude in the axial direction P1. The first protrusion 173 may be coupled to the first groove 118 to prevent slippage of the rotor 110 and the first support member 170 during the rotation. A fixing groove 118a formed in the axial direction may be formed in a bottom surface of the first groove 118. When the first support member 170 and the second support member 180 use identical members, the second support member 180 may also have second protrusions 183 having the same shape.

Referring to FIG. 7, although the pair of second protrusions 183 are shown to be formed on a rear surface of the second flange part 182, the present invention is not necessarily limited thereto. A distance D4 between the second protrusions 183 may be greater than a width of the fixing pin 191. Accordingly, the fixing pin 191 may be inserted between the second protrusions 183 and coupled to the rotating shaft 140. The first protrusions of the first support member 170 may also have the same shape.

Referring to FIG. 8, the second flange part 182 may include cut-out parts 182a formed in outer side surfaces thereof. Accordingly, slippage may be prevented without a separate protrusion. The first support member may also have the same shape as the second support member.

Figure 9:
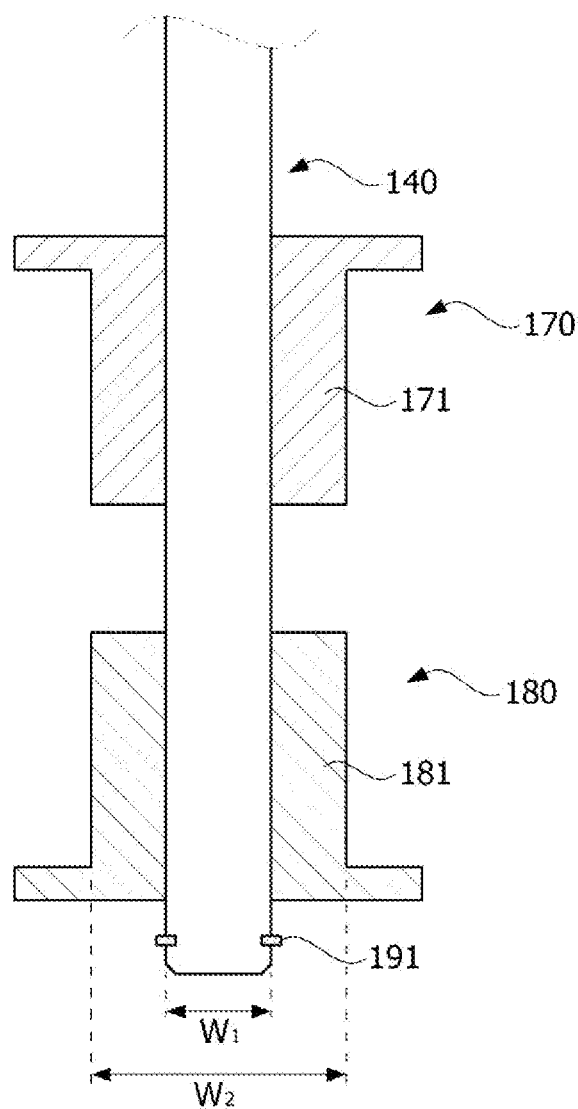
FIGS. 9 and 10 are views illustrating a state in which a thickness of the support member varies according to a thickness of a rotating shaft.
Figure 10:
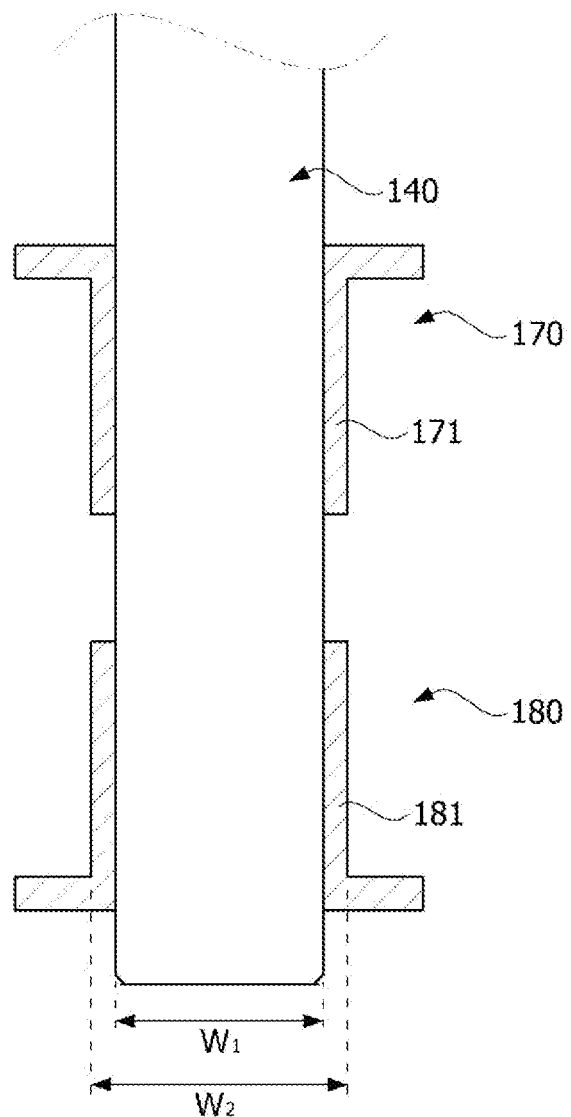

FIGS. 9 and 10 are views illustrating a state in which the thickness of the support member varies according to a thickness of the rotating shaft.

Referring to FIGS. 9 and 10, in the embodiment, diameters W2 of the first support member 170 and the second support member 180 may be adjusted according to the diameter W1 of the rotating shaft 140.

As shown in FIG. 9, when the rotating shaft 140 having a relatively small diameter is used, the thicknesses (W2−W1) of the first support member 170 and the second support member 180 may be relatively great.

Further, as shown in FIG. 10, when the rotating shaft 140 having a relatively great thickness is used, the thicknesses (W2−W1) of the first support member 170 and the second support member 180 may be relatively greater. Accordingly, since the outer diameter W2 of the support member is the same even when the diameter of the rotating shaft 140 is changed, a conventional bearing may be used intactly.

Further, the thicknesses of the first support member 170 and the second support member 180 may be changed even when it is necessary to change the inner diameter of the bearing while maintaining the diameter of the rotating shaft 140. Accordingly, the degree of freedom in a design of a diameter of the rotating shaft 140 and an inner diameter of the bearing may be secured by adjusting the thickness of the support member.

According to the embodiment, when a material used for the first support member 170 and the second support member 180 is relatively lighter than a material used for the rotating shaft 140, the rotating shaft 140 may be manufactured to be thin while maintaining the same coupling force as that in the conventional case. Accordingly, a weight of the motor 10 may be reduced. Further, the first support member 170 and the second support member 180 may be brought into contact with the rotating shaft 140 to prevent corrosion due to an external environment.

For example, the first support member 170 and the second support member 180 may be made of aluminum but the present invention is not limited thereto.

While the embodiments of the inventive concept have been described with reference to the accompanying drawings, it should be understood by those skilled in the art that various modifications may be made without departing from the scope of the inventive concept and without changing essential features thereof.

The invention claimed is:

1. A drone motor comprising:
a rotating shaft;
a stator including a hole into which the rotating shaft is inserted; and
a rotor disposed at an outside of the stator, wherein the rotor includes a rotor core facing an outer circumferential surface of the stator, a plurality of magnets disposed on an inner surface of the rotor core, and a cover configured to cover the rotor core,
wherein a support member is disposed between the rotating shaft and the stator,
a bearing is disposed between the support member and the stator, and
the support member includes a body part configured to surround the rotating shaft and a flange part coupled to the rotor,
wherein the cover includes a first groove in which the flange part is accommodated, and
wherein the flange part includes at least one first protrusion configured to protrude toward the cover and inserted into a bottom surface of the first groove.

2. The drone motor of claim 1, wherein:
the bearing includes a first bearing disposed between the rotating shaft and the stator, and a second bearing disposed between the rotating shaft and the stator; and
the support member includes a first support member including a first body part disposed between the rotating shaft and the first bearing and a first flange part coupled to the rotor, and a second support member including a second body part disposed between the rotating shaft and the second bearing and a second flange part.

3. The drone motor of claim 1, further comprising a housing in which the stator is accommodated, wherein the housing includes a bottom part and a protruding part which axially protrudes from the bottom part and into which the stator is inserted.

4. The drone motor of claim 3, wherein:
the protruding part includes a first hole formed in an axial direction thereof;
the rotating shaft passes through the first hole; and
the first bearing and the second bearing are disposed in the first hole.

5. The drone motor of claim 4, wherein the first hole includes a step by which the first bearing is spaced apart from the second bearing in the axial direction.

6. The drone motor of claim 5, wherein:
the first support member is inserted into one side of the first hole to fix the first bearing in the first hole; and
the second support member is inserted into the other side of the first hole to fix the second bearing in the first hole.

7. The drone motor of claim 2, wherein:
a diameter of the first flange part is greater than an inner diameter of the first bearing and smaller than an outer diameter of the first bearing; and
a diameter of the second flange part is greater than an inner diameter of the second bearing and smaller than an outer diameter of the second bearing.

8. The drone motor of claim 2, wherein:
the cover includes a plurality of blades and holes disposed between the blades.

9. A drone comprising:
a main body;
a plurality of motors connected to the main body; and
a blade part coupled to the plurality of motors,
wherein the motor includes a rotating shaft, a stator including a hole into which the rotating shaft is inserted, and a rotor disposed at an outside of the stator,
a support member is disposed between the rotating shaft and the stator,
a bearing is disposed between the support member and the stator, and
the support member includes a body part configured to surround the rotating shaft and a flange part coupled to the rotor,
wherein the rotor includes a rotor core facing an outer circumferential surface of the stator, a plurality of magnets disposed on an inner surface of the rotor core, and a cover configured to cover the rotor core,
wherein the cover includes a first groove in which the flange part is accommodated, and
wherein the flange part includes at least one first protrusion configured to protrude toward the cover and inserted into a bottom surface of the first groove.

* * * * *